United States Patent [19]

Brown et al.

[11] 4,184,441

[45] Jan. 22, 1980

[54] ELECTRONICALLY CONTROLLED HOUSEHOLD SEWING MACHINE HAVING PATCH SEWING CAPABILITY

[75] Inventors: Jack Brown, Union; Donald J. Coughenour, Morristown; Russell J. Pepe, Piscataway, all of N.J.

[73] Assignee: The Singer Company, New York, N.Y.

[21] Appl. No.: 31,677

[22] Filed: Apr. 19, 1979

[51] Int. Cl.² .......................... D05B 3/02; D05B 3/12; D05B 27/20
[52] U.S. Cl. ................................ 112/158 E; 112/310
[58] Field of Search ............... 112/158 E, 158 B, 309, 112/310, 121.12, 104, 113, 265.1, 262.3

[56] References Cited

U.S. PATENT DOCUMENTS

| | | | |
|---|---|---|---|
| 3,561,382 | 2/1971 | Ketterer et al. | 112/158 R X |
| 3,830,175 | 8/1974 | Levor | 112/121.12 |
| 4,085,691 | 4/1978 | Coughenour et al. | 112/158 E |
| 4,121,526 | 10/1978 | Coulombe | 112/158 B X |
| 4,123,981 | 11/1978 | Brown | 112/158 E |
| 4,144,827 | 3/1979 | Brown | 112/158 E |

*Primary Examiner*—Peter P. Nerbun
*Attorney, Agent, or Firm*—David L. Davis; Robert E. Smith; Edward L. Bell

[57] ABSTRACT

An electronically controlled sewing machine having the capability for lateral feeding in addition to longitudinal feeding is provided with an arrangement for effecting closed path pattern stitching. Selector switches having indicia thereon representative of the direction of sewing effected by operation of the respective switches are positioned so that the indicia visually simulates the closed path pattern.

3 Claims, 11 Drawing Figures

| STITCH No. | FORWARD MULTISTITCH ||||
| --- | --- | --- | --- | --- |
| | BIGHT CODE | NEEDLE POS. | FEED CODE | FEED INCR. |
| 1 | 00101 | +0.10 | 01000 | +0.089 |
| 2 | 01111 | 0.0 | 01000 | +0.089 |
| 3 | 11001 | −0.10 | 01000 | +0.089 |
| 4 | 01111 | 0.0 | 01000 | +0.089 |
*Fig. 4A.*
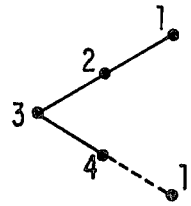
*Fig. 5A.*
| STITCH No. | SEW RIGHT (fabric to the left) |||||||
| --- | --- | --- | --- | --- | --- | --- | --- |
| | PULSE LOW to HIGH || PULSE HIGH to LOW ||||| 
| | BIGHT || NEEDLE FEED || WORK FEED ||
| | CODE | NEEDLE POS. | CODE | NEEDLE POS. | CODE | FEED INCR. |
| 1 | 10001 | −0.02 | 01101 | +0.02 | 01001 | +0.079 |
| 2 | 10001 | −0.02 | 01101 | +0.02 | 01001 | +0.079 |
| 3 | 10001 | −0.02 | 01101 | +0.02 | 01001 | +0.079 |
| 4 | 10001 | −0.02 | 01101 | +0.02 | 11011 | −0.079 |
| 5 | 10001 | −0.02 | 01101 | +0.02 | 11011 | −0.079 |
| 6 | 10001 | −0.02 | 01101 | +0.02 | 11011 | −0.079 |
*Fig. 4B.*
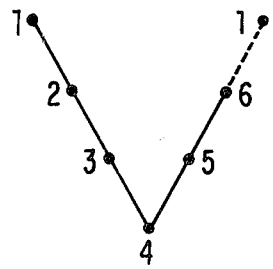
*Fig. 5B.*

Fig. 4c.
| STITCH No. | REVERSE MULTISTITCH | | | |
|---|---|---|---|---|
| | BIGHT CODE | NEEDLE POS. | FEED CODE | FEED INCR. |
| 1 | 11001 | −0.10 | 11100 | −0.089 |
| 2 | 01111 | 0.0 | 11100 | −0.089 |
| 3 | 00101 | +0.10 | 11100 | −0.089 |
| 4 | 01110 | 0.0 | 11100 | −0.089 |
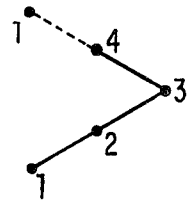
Fig. 5c.
Fig. 4D.
| STITCH No. | SEW LEFT (fabric to the right) | | | | | |
|---|---|---|---|---|---|---|
| | PULSE LOW to HIGH | | PULSE HIGH to LOW | | | |
| | BIGHT | | NEEDLE FEED | | WORK FEED | |
| | CODE | NEEDLE POS. | CODE | NEEDLE POS. | CODE | FEED INCR. |
| 1 | 01101 | +0.02 | 10001 | −0.02 | 01001 | +0.079 |
| 2 | 01101 | +0.02 | 10001 | −0.02 | 01001 | +0.079 |
| 3 | 01101 | +0.02 | 10001 | −0.02 | 01001 | +0.079 |
| 4 | 01101 | +0.02 | 10001 | −0.02 | 11011 | −0.079 |
| 5 | 01101 | +0.02 | 10001 | −0.02 | 11011 | −0.079 |
| 6 | 01101 | +0.02 | 10001 | −0.02 | 11011 | −0.079 |
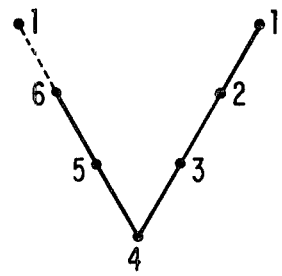
Fig. 5D.

ELECTRONICALLY CONTROLLED HOUSEHOLD SEWING MACHINE HAVING PATCH SEWING CAPABILITY

DESCRIPTION

BACKGROUND OF THE INVENTION

This invention relates to electronically controlled household sewing machines and, more particularly, to such a sewing machine having the capability for sewing a closed path pattern for applying a patch to a work fabric.

When a patch is applied to a work fabric, it is necessary to sew a substantially closed path connecting the perimeter of the patch to the work fabric. When such sewing is to be done by a sewing machine, certain problems are apt to arise. If the work fabric and the patch are relatively small, assuming the patch to be substantially rectangular in shape, the sewing machine operator can begin sewing at a corner of the patch, sew along one edge of the patch to another corner thereof, and with the needle penetrating the work fabric, pivot the patch and the work fabric and the sew along a second edge of the patch. This procedure may be repeated along all the edges of the patch. However, if the work fabric is relatively large, it may prove exceedingly cumbersome to turn the patch and work fabric without removing them from the sewing machine. Commonly, patches are sewn on tubular garments, for example at the elbow of a shirt sleeve or at the knee of a pant leg. A tubular garment may be sewn on a cylinder bed sewing machine but there is no way that the garment can be turned for longitudinal sewing along the axis of the tubular garment.

It is therefore an object of this invention to provide a sewing machine with an arrangement for sewing a substantially closed path pattern on a work fabric.

To accomplish this objective, it would be desirable to have a sewing machine with a lateral feeding capability. Such capability in known in the prior art. For example, U.S. Pat. No. 3,561,382, to Ketterer et al, discloses a sewing machine having a removable cam mechanism which influences motion of the needle bar and needle attached thereto while in the work fabric, thereby to effect a lateral feeding of the work fabric. More recently, electronically controlled sewing machines have been developed, including those with a lateral feeding capability. For example, U.S. Pat. No. 4,123,981, to Brown, discloses an electronically controlled sewing machine wherein lateral feeding or a limited degree of lateral patterning is achieved by applying bight pattern information to the feed system and by applying arm shaft position sensor signals to the bight actuating circuit. While a skillful operator may learn to manipulate the controls of such a sewing machine to sew a substantially closed path pattern, it would be desirable to provide an arrangement wherein this capability is apparent to even the most unskilled of operators.

It is therefore a further object of this invention to provide an arrangement in an electronically controlled sewing machine for sewing a substantially closed path pattern of stiches, which arrangement is simple to learn and use.

SUMMARY OF THE INVENTION

This invention is implemented in a sewing machine having stitch forming instrumentalities positionally controlled over a predetermined range to produce a pattern of successive feed and bight controlled stitches, the instrumentalities including a needle carrying bar supported for selective lateral jogging movement and for endwise reciprocation alternately to move a needle carried thereby into and out of engagement with a work material being sewn and including a work material feed system effective to feed a work material at a selected rate in a selected longitudinal direction substantially perpendicular to the lateral jogging movement of the needle carrying bar when the needle is out of engagement with the work material. The sewing machine further includes memory means for storing pattern stitch information, signal means operating in timed relation with the sewing machine for recovering selected pattern stitch information from the memory means, feed actuating circuit means including an actuator, and bight actuating circuit means including an actuator, the feed and bight actuating circuit means being responsive to the selected feed and bight pattern stitch information, respectively, for positioning the stitch forming instrumentalities to produce a pattern of stitches corresponding to the selected pattern stitch information. Additionally, the sewing machine includes means for storing supplemental pattern stitch information for positioning the needle carrying bar when the needle moves into engagement with the work material and means for applying the supplemental pattern stitch information to the actuator of the bight actuating circuit means while the needle is in engagement with the work material. The aforestated and additional objectives are attained by providing first means for storing pattern stitch information corresponding to forward sewing, second means for storing pattern stitch information and supplemental pattern stitch information corresponding to rightward sewing, third means for storing pattern stitch information corresponding to reverse sewing and fourth means for storing pattern stitch information and supplemental pattern stitch information corresponding to leftward sewing. Stitching direction selection means are also provided, including first selector switch means for effecting retrieval of information from the first storing means, second selector switch means for effecting retrieval of information from the second storing means, third selector switch means for effecting retrieval of information from the third storing means and fourth selector switch means for effecting retrieval of information from the fourth storing means. The first, second, third and fourth selector switch means have indicia thereon for indicating to an operator the sewing direction effected by operation of the respective selector switch means and the first, second, third and fourth selector switch means are positioned so that the indicia visually simulates the closed path pattern.

In accordance with an aspect of this invention, each of the indicia comprises an arrow pointing in a respective direction corresponding to the direction of sewing effected by operation of the respective selector switch means.

BRIEF DESCRIPTION OF THE DRAWINGS

The foregoing will be more readily apparent upon reading the following description in conjunction with the drawings wherein:

FIGS. 4A–4D are illustrative tables listing binary code words for producing directional sewing in accordance with this invention; and FIGS. 5A–5D represent the stitch patterns obtained by employing the code words listed in the tables of FIGS. 4A–4D, respectively.

DESCRIPTION OF THE PREFERRED EMBODIMENT

Figure 1:
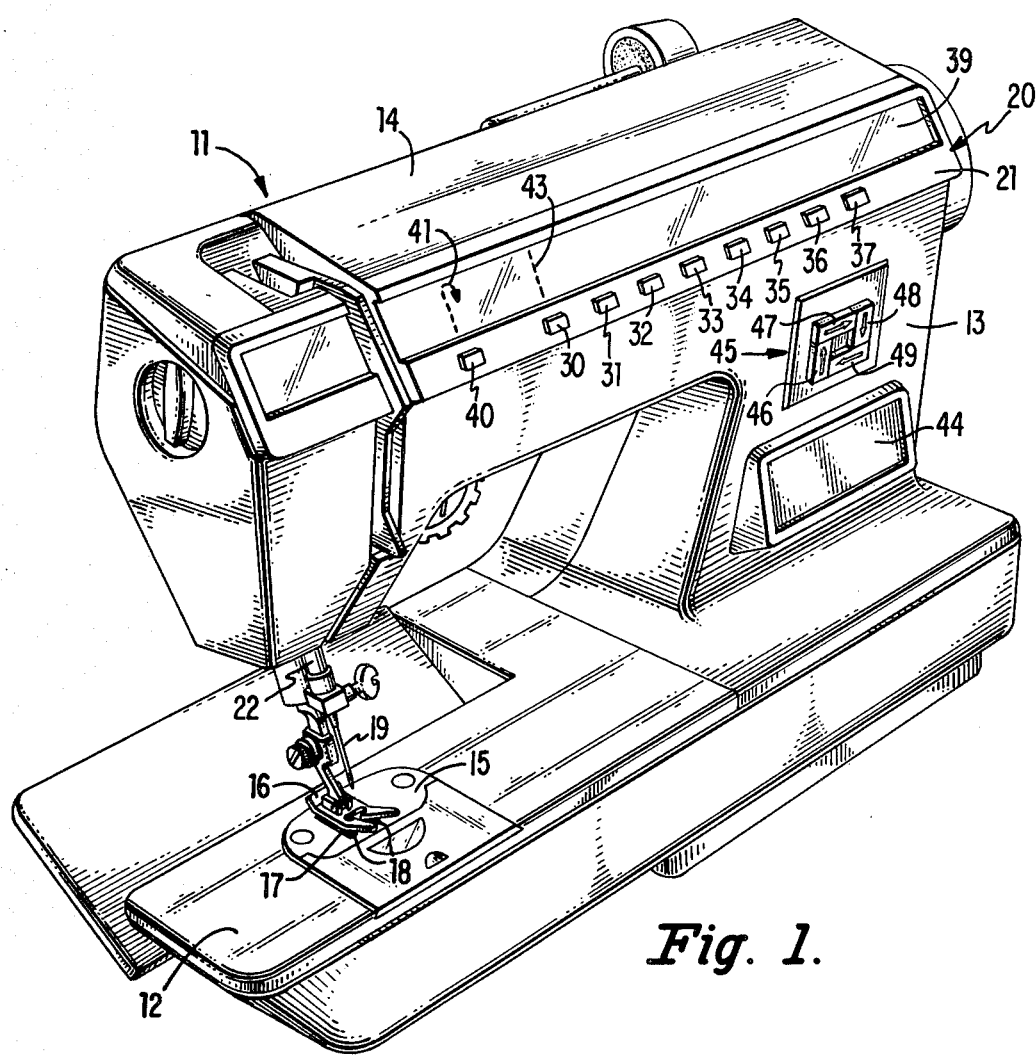
FIG. 1 is a perspective view of a sewing machine hAving incorporated therein an arrangement constructed in accordance with the principles of this invention.

Referring now to the drawings, FIG. 1 depicts a sewing machine 11 having embodied therein an arrangement constructed in accordance with the principles of this invention. The sewing machine 11 shown in FIG. 1 is of the type shown and described in U.S. Pat. No. 4,135,462, entitled "X-Y PATTERNING BY ELECTRONICALLY CONTROLLED HOUSEHOLD SEWING MACHINES", issued Jan. 23, 1979, to Jack Brown and assigned to the assignee herein, the disclosure of which patent is hereby incorporated by reference. The sewing machine 11 includes a work supporting bed 12 from which rises a standard 13 supporting a bracket arm 14 overhanging the bed 12. A throat plate 15 carried on the bed 12 supports the thrust of a spring loaded presser device 16 carried in the bracket arm 14. Work fabrics to be stitched are urged by the presser device 16 downwardly against the throat plate 15 and against a work feed dog 17 which works upwardly through slots 18 in the throat plate 15 to feed the work fabric. The throat plate 15 is also apertured to accommodate the reciprocation of a needle 19 carried on the end of a needle 22, which needle bar is supported in the bracket arm 14 for endwise reciprocation and lateral oscillation in a manner well known in the sewing machine art.

The bracket arm 14 of the sewing machine 11 is preferably fitted with a control assembly 20 which includes an escutcheon plate 21 through which a plurality of pattern selection buttons 30–37 protrude, and a transparent insert 39 through which indicia in close association with the selector buttons 30–37 are visible. An additional button 40 is provided shiftably supported to protrude through the escutcheon plate 21 for the purpose of manually influencing reverse stitching. Suitable indicia 41 may be arranged on the transparent insert 39 above the feed reversing button 40 to identify the purpose of this control element for a machine operator. Similarly, indicia 43 may be supplied above the selector button 30, the operation of which would influence straight stitching in a forward direction. A panel 44 is provided on the forward surface of the standard 13, which panel serves to normally conceal those controls necessary to vary bight, feed or feed balance for closed patterns such as buttonholes.

In accordance with the principles of this invention, there is provided, illustratively on the standard 13, a stitching direction selection means 45 including a first selector switch 46, a second selector switch 47, a third selector switch 48 and a fourth selector switch 49. These switches 46–49 function as do the pattern selecton buttons 30–37 to retrieve from memory respective stitch pattern information. Each of the switches 46–49 has visible indicia thereon for indicating to an operator the direction of sewing effected by operation of the respective switch. In particular, as shown in FIG. 1, this indicia may be a representation of an arrow pointing in a respective direction corresponding to the direction of sewing effected by operation of the respective selector switch 46–49. For example, the first selector switch 46 has thereon a representation of an arrow pointing in a direction corresponding to forward sewing, the second selector switch 47 has thereon a representation of an arrow pointing in a direction corresponding to rightward sewing, the third selector switch 48 has thereon a representation of an arrow pointing in a direction corresponding to reverse sewing and the fourth selector switch 49 has thereon a representation of an arrow pointing in a direction corresponding to leftward sewing. Advantageously, the selector switches 46–49 are positioned so that the indicia thereon visually simulates the closed path pattern which may be sewn by the sequential operation of the selector switches 46–49. Although not shown in FIG. 1, indicators, such as respective light emitting diodes, may be provided for indicating which sewing direction has been chosen. These indicators would be in close proximity to the respective selector switches 46–49. For example, the indicators could be LED's embedded within the switch buttons 46–49. While the selector switches 46–49 have been shown as being on the standard 13, other placements of these switches are contemplated as being within the scope of this invention. For example, the switches may be placed on the bed 12 of the sewing machine or, alternatively, may be on a separate module adapted to be plugged into the sewing machine 11. What is contemplated as being within the scope of this invention is the arrangement of the switches with the indicia thereon to visually simulate the closed path pattern and to provide for ease in operation. This ease in operation results because the operator can follow the closed path right on the switches 46–49 and operate these switches 46–49 in a sequential progression as indicated by the switches themselves.

Figure 2:
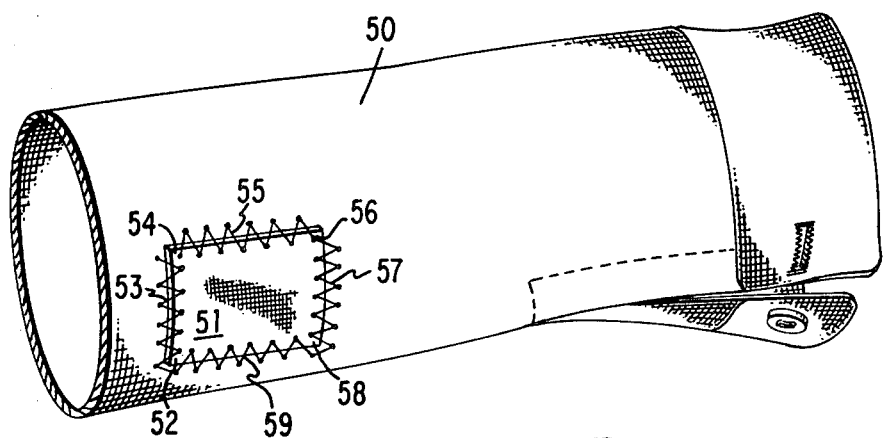
FIG. 2 illustrates a work fabric having a patch sewn thereon by a sewing machine of the type illustrated in FIG. 1.

FIG. 2 illustrates an article which may be advantageously sewn in accordance with the arrangement described above. In particular, a sleeve 50 is shown having a patch 51 sewn thereon. The sleeve 50 is a tubular garment and for sewing such a garment on the sewing machine 11 the bed 12 is converted into a cylinder bed, as is well known in the sewing machine art. In order to sew the patch 51 on the sleeve 50, the sleeve 50 would then be placed around the cylindrically formed bed 12, the patch 51 would be placed over the sleeve 50, and the patch and sleeve would be positioned so that a selected corner of the patch would be beneath the needle 19. For example, if the corner 52 were placed beneath the needle 19, the operator would first operate the switch 46 to sew the line of stitches 53 to the corner 54, then operate the switch 47 to sew the line of stitches 55 to the corner 56, then operate the switch 48 to sew the line of stitches 57 to the corner 58 and then operate the switch 49 to sew the line of stitches 59 back to the corner 52, thereby completing a closed path pattern of stitches. It is understood that the sewing can be commenced at any desired point along the path and the path may be sewn in either a clockwise or a counterclockwise direction.

Figure 3:
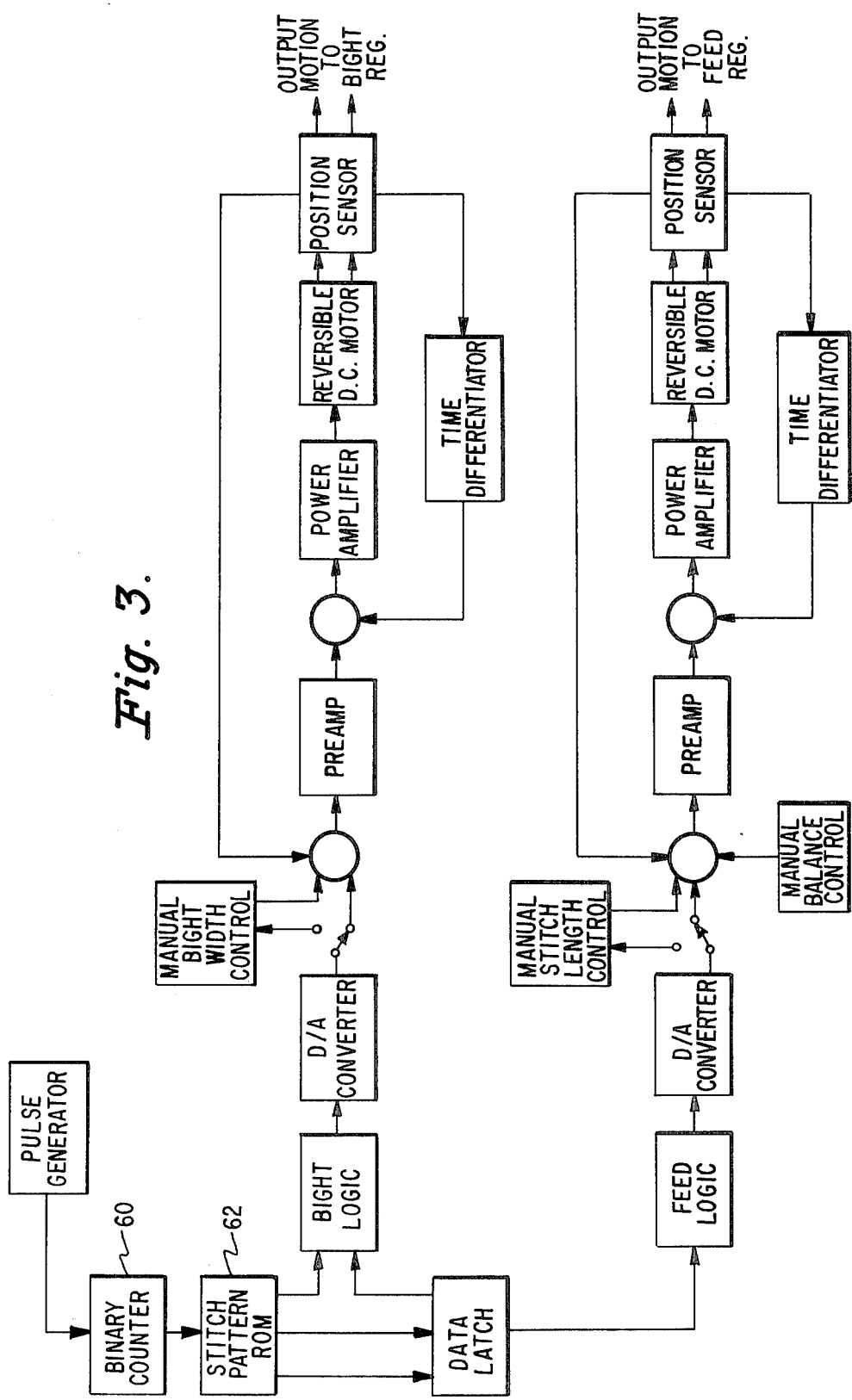
FIG. 3 is a simplified block diagram of an electronically controlled sewing machine having incorporated therein an arrangement constructed in accordance with the principles of this invention.

FIG. 3 shows a schematic block diagram for the sewing machine in which this invention may be incorporated. For an explanation of this block diagram, the reader is referred to the above-referenced U.S. Pat. No.

4,135,462, which has been incorporated by reference herein. The stitching direction selection means 45 including the selector switches 46–49 form a part of the pattern selection arrangement and functions to provide the binary counter 60 with an appropriate starting address for the stitch pattern ROM 62.

An illustrative stitch pattern which may be utilized to form a closed path pattern of stitches in accordance with this invention is the pattern known as a multistitch zigzag pattern. FIGS. 4A–4D show illustrative coding tables for such stitch pattern and FIGS. 5A–5D show the patterns of needle penetrations corresponding thereto. In particular, the table shown in FIG. 4A indicates the binary code words retained in the stitch pattern ROM 62 and released sequentially therefrom in order to achieve the pattern shown in FIG. 5A. This pattern corresponds to forward sewing of a multistitch zigzag pattern in response to operation of the selector switch 46. Adjacent each code word is the needle position dimension from center needle position, and the feed increment dimension represented by that binary code word. Center needle position is indicated by zero, left needle position by a positive value and right needle position by a negative value. A positive feed increment indicates forward feed and a negative feed increment indicates reverse feed.

The table shown in FIG. 4B indicates the binary code words corresponding to rightward sewing, which is effected in response to operation of the selector switch 47. This table contains a column corresponding to code words for needle feed, a full description of which may be obtained from a reading of the above-referenced U.S. Pat. No. 4,135,462. FIG. 5B shows the needle penetrations for a single repetition of the rightward sewing multistitch zigzag pattern.

The table shown in FIG. 4C contains the binary code words corresponding to reverse sewing obtained in response to operation of the selector switch 48 and FIG. 5C shows a corresponding pattern of needle penetrations.

The table shown in FIG. 4D contains the binary code words corresponding to leftward sewing effected in response to operation of the selector switch 49 and FIG. 5D shows the pattern of needle penetrations resulting therefrom. Like rightward sewing, discussed above, leftward sewing also includes a needle feed component.

Accordingly, there has been disclosed an arrangement for effecting sewing of a closed path pattern, which may be advantageously utilized for sewing patches on a garment, and which is simple to learn and operate. It is understood that the above-described embodiment is merely illustrative of the application of the principles of this invention. Numerous other embodiments may be devised by those skilled in the art without departing from the spirit and scope of this invention, as defined by the appended claims. Thus, although a multistitch zigzag pattern has been described above, it is contemplated that other patterns may also be used, such as, for example, a simple zigzag, a straight stitch, or even other decorative patterns. Further, it is possible for an operator to select a desired pattern which is to be sewn in a closed path.

We claim:

1. In a sewing machine having stich forming instrumentalities positionally controlled over a predetermined range to produce a pattern of successive feed and bight controlled stitches, said instrumentalities including a needle carrying bar supported for selective lateral jogging movement and for endwise reciprocatory motion alternately to move a needle carried thereby into and out of engagement with a work material being sewn and including a work material feed system effective to feed a work material at a selected rate in a selected longitudinal direction substantially perpendicular to said lateral jogging movement of said needle carrying bar when said needle is out of engagement with said work material; memory means for storing patten stitch information; signal means operating in timed relation with the sewing machine for recovering selected pattern stitch information from said memory means; feed actuating circuit means including an actuator; bight actuating circuit means including an actuator; said feed and bight actuating circuit means being responsive to said selected feed and bight pattern stitch information, respectively, for positioning said stitch forming instrumentalities to produce a pattern of stitches corresponding to the selected pattern stitch information; means for storing supplemental pattern stitch information for positioning said needle carrying bar when said needle moves into engagement with said work material; and means for applying said supplemental pattern stitch information to said actuator of said bight actuating circuit means while said needle is in engagement with said work material; the improvement comprising means adapted for sewing a substantially closed path pattern of stitches including:

first means for storing pattern stitch information corresponding to forward sewing;
   second means for storing pattern stitch information and supplemental pattern switch information corresponding to rightward sewing;
   third means for storing pattern stitch information corresponding to reverse sewing;
   fourth means for storing pattern stitch information and supplemental pattern stitch information corresponding to leftward sewing; and
   stitching direction selection means including first selector switch means for effecting retrieval of information from said first storing means, second selector switch means for effecting retrieval of information from said second storing means, third selector switch means for effecting retrieval of information from said third storing means, and fourth selector switch means for effecting retrieval of information from said fourth storing means, and first, second, third and fourth selector switch means having indica thereon for indicating to an operator the sewing direction effected by operation of the respective selector switch means and said first, second, third and fourth selector switch means being positioned so that said indicia visually simulates said closed path pattern.

2. The imrpovement according to claim 1 wherein each of said indicia comprises an arrow pointing in a respective direction corresponding to the direction of sewing effected by operation of the respective selector switch means.

3. The improvement according to claim 1 wherein each direction of sewing is effected by a respective multistitch zigzag pattern.

* * * * *